United States Patent [19]
Ament et al.

[11] Patent Number: 5,630,491
[45] Date of Patent: May 20, 1997

[54] FRICTION CLUTCH FOR A TRANSMISSION OF A MOTOR VEHICLE AND A CLUTCH DISC FOR A FRICTION CLUTCH

[75] Inventors: Norbert Ament, Eltingshausen; Harald Raab, Schweinfurt, both of Germany

[73] Assignee: Fichtel & Sachs AG, Schweinfurt, Germany

[21] Appl. No.: 288,327

[22] Filed: Aug. 10, 1994

[30] Foreign Application Priority Data

Aug. 12, 1993 [DE] Germany .......................... 43 27 050.6
Mar. 16, 1994 [DE] Germany .......................... 44 08 881.7

[51] Int. Cl.⁶ .................... F16D 13/64; F16D 3/14
[52] U.S. Cl. ................. 192/70.17; 192/213.31; 464/68
[58] Field of Search ............. 192/70.17, 106.1, 192/106.2, 212, 213, 213.3, 213.31, 214, 214.1; 464/66, 68

[56] References Cited

U.S. PATENT DOCUMENTS

| | | | |
|---|---|---|---|
| 3,068,979 | 12/1962 | Arkus-Duntov | 192/70.17 X |
| 3,863,747 | 2/1975 | Werner et al. | |
| 3,948,373 | 4/1976 | Wörner | 192/106.2 |
| 4,036,341 | 7/1977 | Beeskow et al. | 192/106.2 |
| 4,285,423 | 8/1981 | Fädler et al. | 192/106.2 |
| 4,548,310 | 10/1985 | Maucher | 192/106.2 |
| 4,789,053 | 12/1988 | Fischer et al. | 192/106.2 |

FOREIGN PATENT DOCUMENTS

| | | |
|---|---|---|
| 0502529 | 9/1992 | European Pat. Off. . |
| 2506878 | 12/1982 | France . |
| 2418062 | 10/1975 | Germany . |
| 2916868 | 11/1980 | Germany . |
| 3121376 | 12/1982 | Germany . |
| 3400183 | 7/1985 | Germany . |
| 4031762 | 4/1992 | Germany . |
| 4107125 | 9/1992 | Germany . |
| 4125966 | 2/1993 | Germany . |
| 1428557 | 3/1976 | United Kingdom . |
| 2158193 | 11/1985 | United Kingdom . |
| 2233735 | 1/1991 | United Kingdom . |

*Primary Examiner*—Richard M. Lorence
*Attorney, Agent, or Firm*—Nils H. Ljungman and Associates

[57] ABSTRACT

A transmission of a motor vehicle can have a friction clutch with a torsional vibration damper and a clutch disc. In the friction clutch there can be a control plate for the control of a friction action as a function of the torsion angle, which control plate can be centered in one direction perpendicular to the axis of rotation by means of at least two diagonally opposite stop edges. The stop edges preferably can interact with two opposite-facing end surfaces of the coil springs within the clutch disc. It can thereby be possible to center the control plate independently of the guide diameter of the hub.

14 Claims, 4 Drawing Sheets

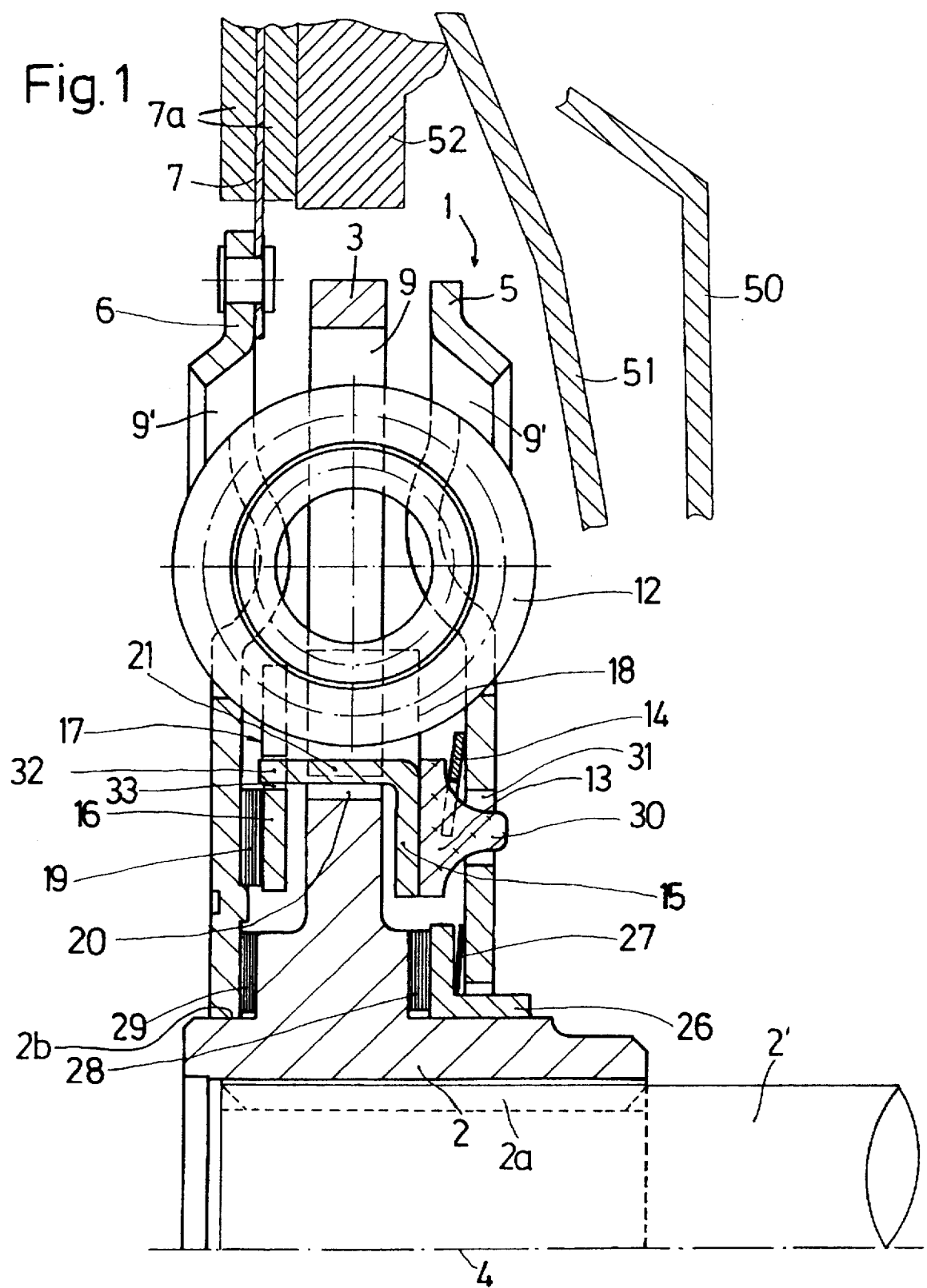

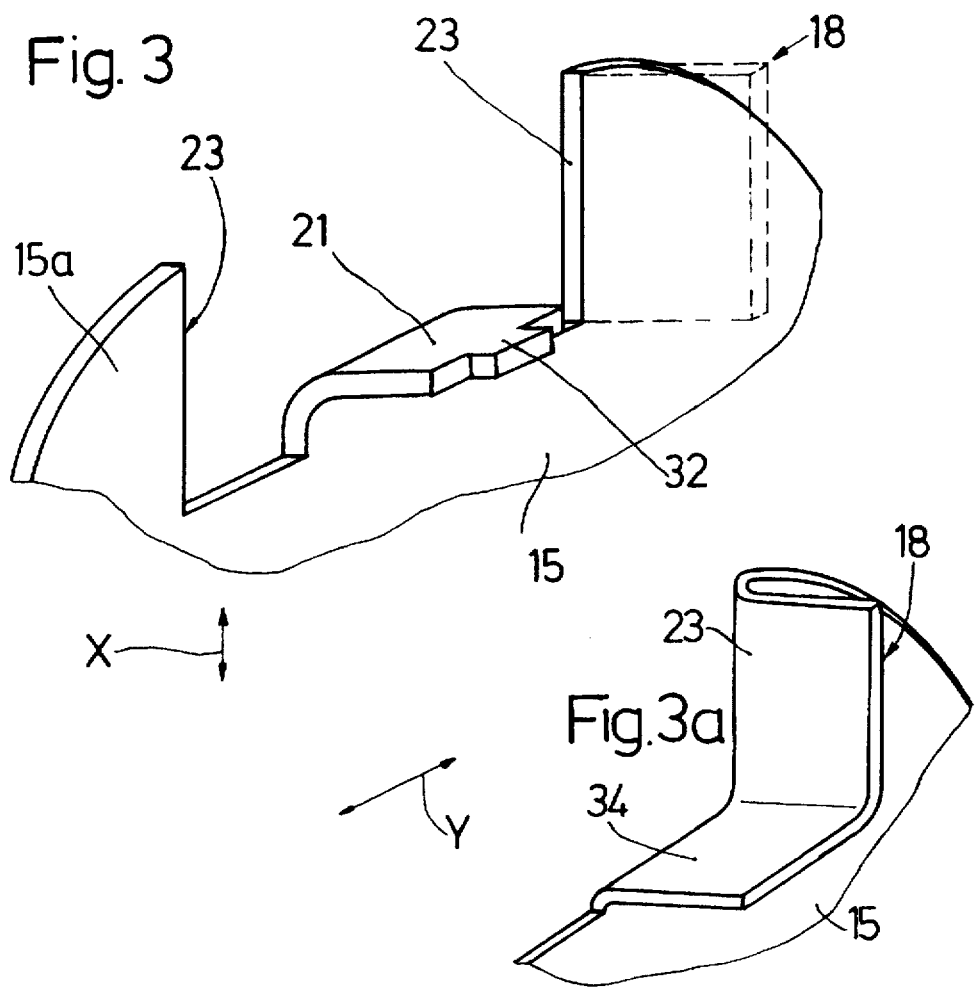
Fig. 3
Fig. 3a
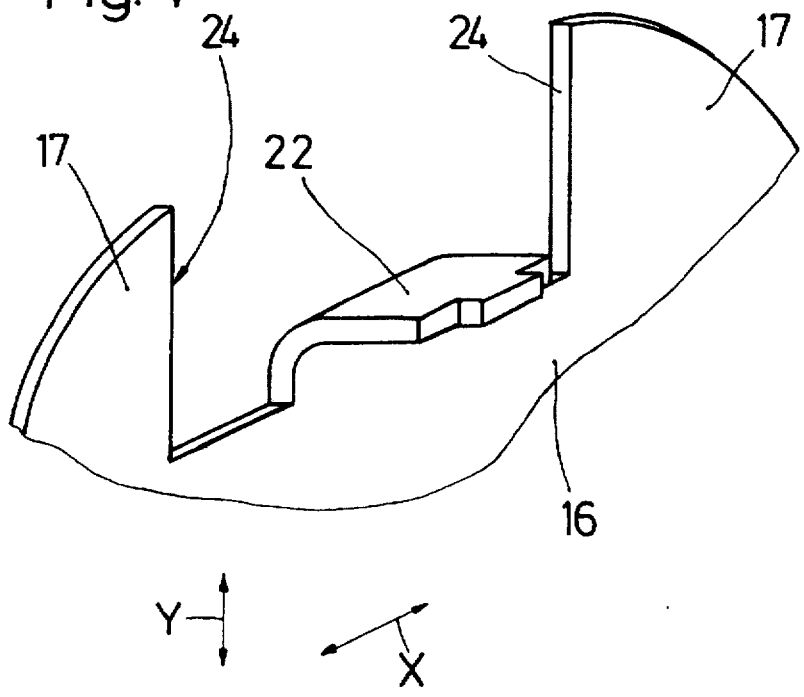
Fig. 4

FRICTION CLUTCH FOR A TRANSMISSION OF A MOTOR VEHICLE AND A CLUTCH DISC FOR A FRICTION CLUTCH

BACKGROUND OF THE INVENTION

1. Field of the Invention

This invention generally relates to a friction clutch for a transmission of a motor vehicle, wherein the friction clutch has a clutch disc. The invention also generally relates to a friction clutch, and more specifically to a torsional vibration damper and clutch disc for a friction clutch. In general, a friction clutch for a transmission of a motor vehicle can have a hub with a hub disc, which hub defines an axis of rotation, and which hub can receive a drive shaft of a transmission therein. In addition, cover plates can be located on both sides of the hub disc and can be firmly connected to one another and held at a distance from one another. The hub disc, or at least one cover plate, in a radially outward location, can have friction linings, and the hub disc and cover plates can have windows for the installation of coil springs to absorb rotational impacts when torque is applied. Such an arrangement can also include a friction device between the hub disc and cover plates, which friction device can have a control plate for the control of a friction action as a function of the torsional angle. The control plate can interact with the springs in the hub disc, by means of two stop edges, which stop edges can preferably be disposed substantially opposite one another in relation to the axis of rotation.

2. Background Information

Clutch discs of the type described above are disclosed, for example, in German Patent No. 34 00 183. For this known clutch disc, a control plate is provided on the one side of the hub disc, and on the other side there is a thrust ring, whereby the control plate and thrust ring are fixed in relation to one another and are axially braced by axially bent tabs. The control plate is however centered on a cylindrical guide area of the hub.

A similar relationship is disclosed in German Patent 24 18 062. Here, to actuate a clutch, there is a control plate which is also centered in relation to the hub by means of a guide diameter of the hub.

OBJECT OF THE INVENTION

The object of the present invention, for clutch discs which can be of the type described above, is to center the control plate about the hub, at least substantially independently of a guide diameter of the hub.

SUMMARY OF THE INVENTION

The present invention teaches that this object can be achieved by a centering of the control plate in at least one direction perpendicular to the axis of rotation, by means of at least two stop edges approximately diagonally opposite one another, which stop edges preferably interact with two opposite-facing end surfaces of the coil springs.

As a result of the centering of the control plate in at least one direction substantially perpendicular to the axis of rotation, by means of at least two approximately diagonally opposite stop edges which interact with two opposite-facing end surfaces of the coil springs, the control plate can be centered essentially independently from the hub. The stop edges thereby essentially have a dual function, namely first to control the friction insert, or lining, and second to center the control plate. With such a configuration, the control plate thereby essentially does not need to extend completely radially inwardly to contact the hub, thereby essentially making it possible to install additionally elements, e.g. parts of a friction device, radially inside the control plate, that is, between the control plate and the hub.

The stop edges can preferably be formed, as a component of the control plate, by tabs which are bent axially and thereby run approximately radially with respect to the hub. The tabs can thereby control the friction effect preferably alone and preferably in connection with corresponding windows in the hub disc. Preferably, these axially bent tabs, essentially alone, can control the friction insert, or lining, as a result of the engagement of the tabs between the ends of the corresponding coil springs and the windows. The tabs thereby essentially represent a particularly simple embodiment which is easy to manufacture.

The present invention also teaches that the stop edges can be formed by tabs which are bent axially and run approximately radially, and which control the friction effect preferably alone and in connection with corresponding windows in the hub disc, whereby each tab can preferably have an extension in the vicinity of its radially inner end, which extension preferably runs approximately tangential to the axis of rotation and close to the contour of the corresponding coil springs. With this configuration, there can be a centering in two directions approximately perpendicular to one another and perpendicular to the axis of rotation. As a result of the presence of an extension on each tab which runs approximately tangential to the axis of rotation and close to the contour of the corresponding coil springs, it is possible to use one component to guide the control plate in two directions which run approximately perpendicular to one another. This guidance mechanism is essentially compact and independent of the design of the hub, and essentially makes it possible to install additional components radially inside the control plate.

It is also possible, with another embodiment of the present invention, by means of additional axially-bent tabs on the control plate, which tabs preferably run approximately tangentially to the axis of rotation ad which are preferably located approximately radially inside the springs which guide the control plate in the one first direction, to guarantee the centering of the control plate also in a direction rotated from the first direction by an angle of 90 degrees, whereby the tabs are preferably engaged at a slight radial distance from the springs in corresponding cutouts in the hub disc. This solution essentially also guarantees that the space radially inside the tabs can be kept free for the installation of other components.

In an alternative configuration in which there is a thrust ring on the side of the hub disc opposite the control plate, and in which both can be mutually braced and centered by axial tabs located on at least one of the thrust ring or control plate, it can be possible to also design the thrust ring with centering lugs. In this manner, a guidance of the thrust ring and also of the control plate in the direction which is offset by approximately 90 degrees in relation to the guidance direction of the control plate, can essentially be provided. The control plate can thereby preferably provide guidance in one direction and the thrust ring can preferably provide guidance in another direction. The tabs for the mutual fixing and axial bracing can thereby preferably be located both on the control plate and on the thrust ring. The centering is therefore essentially variable, within certain limits, and can be easily adjusted to the desired requirements for a particular application.

The present invention also teaches that there can preferably be a total of four coil springs distributed over the circumference, which springs, together with four stop edges of the control plate and thrust ring, preferably center the control plate and thrust ring. Such a design, on account of the essentially symmetrical distribution of the coil springs, makes possible in a simple manner, an essentially secure centering in two directions offset from one another by approximately 90 degrees, and offset from the axis of rotation by 90 degrees.

As a result of the location of a friction ring between the control plate and the one cover plate, which friction ring can preferably be secured by lugs extending through the cover plate so that the friction ring cannot rotate in relation to the cover plate, but can be moved axially, and as a result of the arrangement of a spring plate or membrane, which can be supported with the solid edge of the spring plate on the inside of the cover plate and can be in contact with the edge interrupted by slots in the vicinity of the average, or mean friction radius on the friction ring, it can be possible to achieve very accurate contact of the two friction surfaces between the control plate and the friction ring. The spring plate or membrane with its solid edge can thereby be located either radially outside, or radially inside the friction ring. At the same time, as a result of the axial support of the axially-running tabs of the control plate on the opposite thrust ring, it can essentially be guaranteed that an additional friction device can be located axially between the cover plates and the hub disc, which additional friction device can preferably be adjusted essentially completely independently and can also work essentially independently. It can thereby also be possible in this radially inner area of the hub disc to make the hub disc in two parts, and to locate an idle spring device in this radially inner area.

In summary, one aspect of the invention resides broadly in a friction clutch, such as for a transmission for a motor vehicle, the friction clutch comprising: a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction; and biasing apparatus for biasing the pressure plate apparatus in the axial direction to apply the axial force to the clutch disc, with the clutch disc comprising: a hub, the hub comprising apparatus for engaging shaft apparatus of a transmission, and the hub having a diameter and a circumference; a hub disc disposed concentrically about the hub and extending radially away from the hub, the hub disc having a first side and a second side; a first cover plate disposed adjacent the first side of the hub disc; a second cover plate disposed adjacent the second side of the hub disc; the first and second cover plates being rotatable about the hub with respect to the hub disc; a plurality of biasing members disposed about the hub for torsionally damping the friction clutch; control plate apparatus disposed about the hub, the control plate apparatus having an orifice for being disposed about the hub, the orifice having a diameter, the diameter of the orifice being greater than the diameter of the hub to define an annular space between the control plate apparatus and the hub; the control plate apparatus comprising apparatus for centering the control plate apparatus about the hub in at least one direction; and the apparatus for centering comprising apparatus for engaging at least one of the biasing members.

Another aspect of the invention resides broadly in a clutch disc for a friction clutch, the clutch disc comprising: a hub, the hub defining an axis of rotation; a hub disc disposed concentrically about the the hub and extending radially away from the hub, the hub disc having a first side and a second side; a first cover plate disposed adjacent the first side of the hub disc; a second cover plate disposed adjacent the second side of the hub disc; the first and second cover plates being rotatable about the hub with respect to the hub disc; a plurality of biasing members disposed about the hub for torsionally damping the friction clutch; control plate apparatus disposed about the hub; the control plate apparatus comprising apparatus for centering the control plate apparatus about the hub in at least one first direction; and the apparatus for centering comprising apparatus for engaging at least one of the biasing members.

BRIEF DESCRIPTION OF THE DRAWINGS

The present invention is explained below in greater detail with reference to the embodiments illustrated in the accompanying figures, in which:

FIG. 1 shows the upper half of a longitudinal section through a clutch disc;

FIG. 3 shows a partial view, in perspective, of a control plate with two different axially-bent tabs;

FIG. 3a is a partial view, in perspective, of a control plate with an extension on the tab, which extension runs approximately tangential to the axis of rotation; and FIG. 4 is a partial view in perspective of the centering lug with stop edges ad axially-bent tabs for a thrust plate.

DESCRIPTION OF THE PREFERRED EMBODIMENTS

Figure 1A:
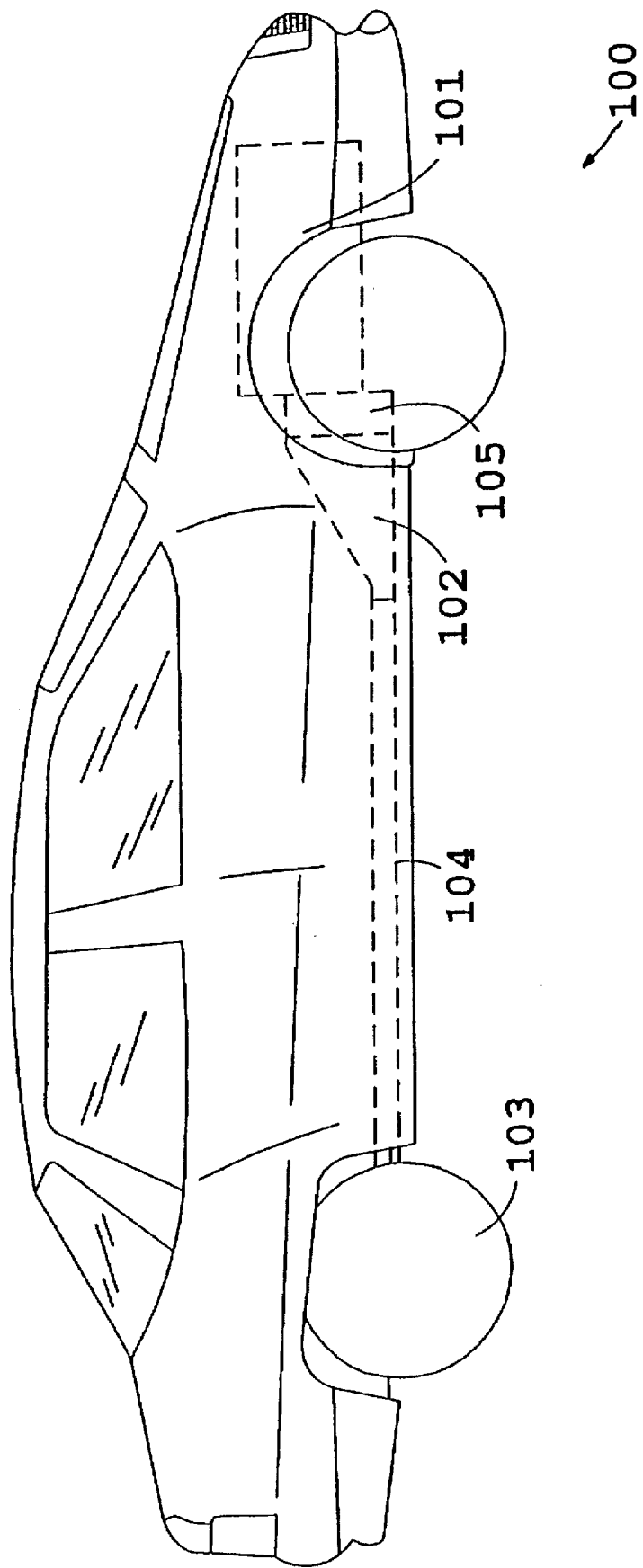
FIG. 1a shows what could be considered to be a typical motor vehicle and transmission incorporating a clutch disc in accordance with FIG. 1.
Figure 2:
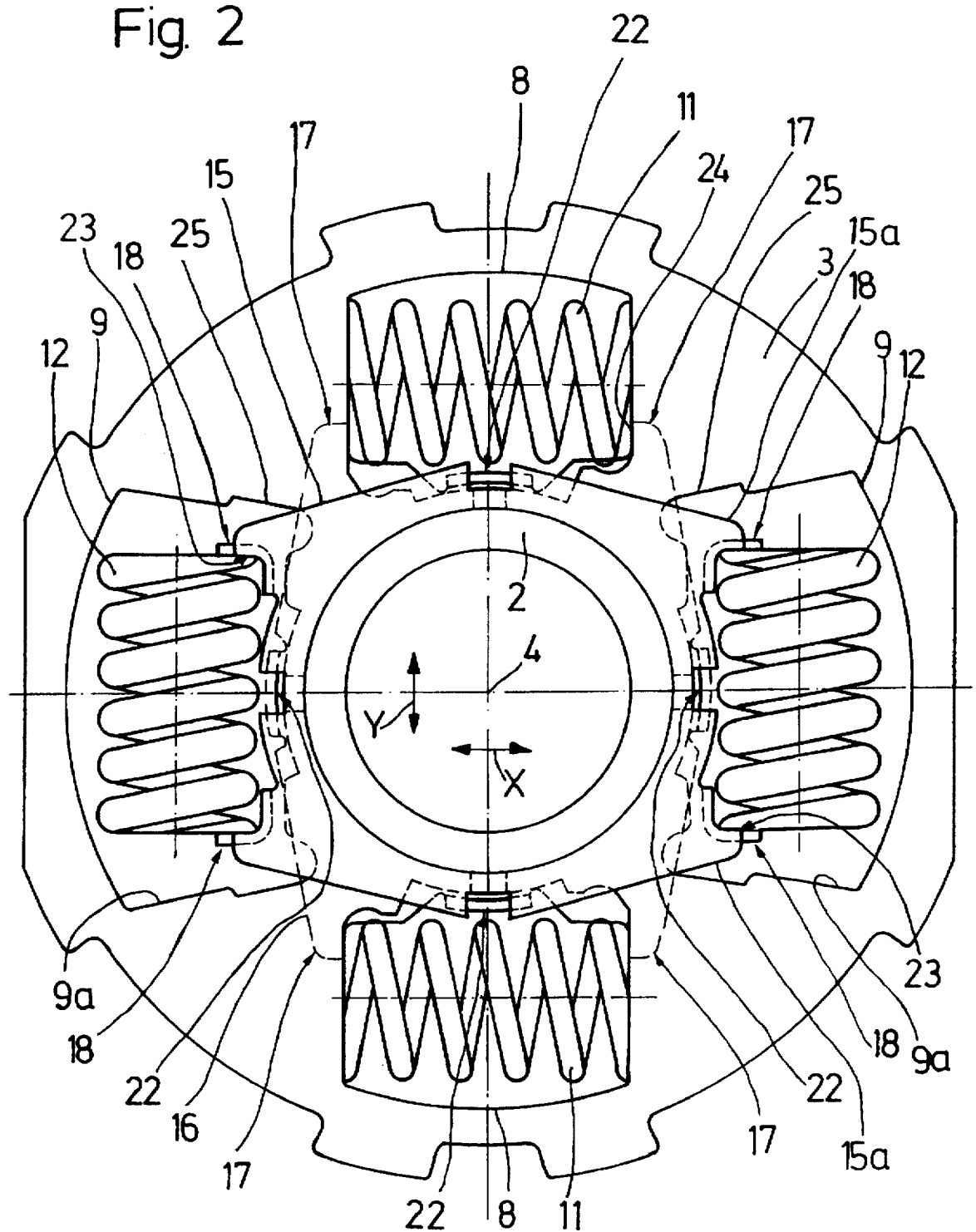
FIG. 2 shows a partial view of the hub disc, control plate and thrust ring together with the coil springs.

In accordance with a first preferred embodiment of the present invention, FIGS. 1 and 2 illustrate a clutch disc of a friction clutch. The clutch disc 1 can generally have a hub 2 which can be configured to be mounted non-rotationally on a transmission shaft (shown in FIG. 1 as 2'). This mounting can be provided, for example, by means of toothing 2a disposed within the hub 2, which toothing 2a (shown in FIG. 1) would be configured to correspond to similar toothing on the transmission shaft 2'. In general, the transmission shaft 2' defines an axis of rotation 4, about which the hub 2 rotates.

A depiction of a motor vehicle and corresponding power transmission components is shown in FIG. 1a, wherein the motor vehicle 100 could typically have an internal combustion engine 101 mounted in a forward position thereof. The motor vehicle could also typically have a transmission 102 for transmission of mechanical power from the engine 101 to the rear vehicle wheels 103 via a drive shaft 104. A friction clutch 105 could preferably be provided, in accordance with the present invention for engaging the transmission 102 with the engine 101.

In addition, as shown in partial section in FIG. 1, the friction clutch could also preferably have a housing 50 for housing the components of the clutch therein. Within the friction clutch, the hub 2 of the clutch plate 1 can preferably be provided with a hub disc 3, which hub disc 3 can be integral with the hub 2, and which hub disc 3 can point radially outward from the hub 2.

On both sides of the hub disc 3, cover plates 5 and 6 can preferably be provided, which cover plates 5 and 6 can be fixed in relation to one another; and held at an axial distance in relation to one another. At least one of the two cover plates, for example, the cover plate 6 as shown in FIG. 1, in its radially outer region, can preferably have a lining support 7, to which friction linings 7a can be fastened, as shown in FIG. 1. The two cover plates 5 and 6, for example, can preferably be guided in the radial direction, by means of a bore in one of the two plates, on a cylindrical guide surface 2b of the hub 2, as also shown in FIG. 1

Within the housing 50 there could also preferably be a pressure plate device 52 for applying an axial force to the friction linings 7a to engage the linings 7a with a counter-thrust plate (not shown) which would essentially be rotating with the engine, to thereby cause the hub disc 3 to also rotate with the engine and turn the shaft 2'. The pressure source for applying this axial pressure to the pressure plate device 52 could preferably be a biasing member, such as a spring device 51, which can bias the pressure plate away from the housing 50. Such arrangements of pressure plate device 52, biasing members 51 and housing 50 are generally well known, and are therefore shown only schematically in the figures.

In the hub disc 3 there will typically be windows 8, 9 (see FIG. 2) in which windows coil springs 11, 12 will generally be disposed. These coil springs 11, 12 can essentially be disposed about the hub disc 3 over the same average diameter from the axis of rotation 4, and can also essentially be uniformly placed about the circumference. FIG. 2 shows the coil springs 12 located in windows 9, the periphery of which windows 9 can preferably be greater than he length of the springs 12, so that the ends of the springs 12 preferably do not contact the sides 9a of the windows 9. Similar windows 9' will typically be located in the cover plates 5 and 6, but the peripheral size of the windows 9' will generally not be greater than the lengths of the springs 11 or 12 when the springs 11 or 12 are installed in the windows, and in the absence of any torque being applied to the springs by the clutch disc 1.

As shown in FIGS. 1 and 2, radially inside the coil springs 11, 12 and between the cover plates 5 or 6 and the hub disc 3, additional components can be provided. On the one side there can preferably be a friction ring 13 with lugs 30 that can be guided in openings 31 of the cover plate 5, a spring 14, and a control plate 15. One set of the lugs 30 and openings 31 are shown in the sectional view of FIG. 1. On the opposite side there can be a thrust ring 16 and a friction ring 19. The control plate 15 and thrust ring 16 can preferably be held non-rotationally to one another and at an axial distance form one another, by means of axially-bent tabs 21, 22, which can be provided on either one, or both parts. These tabs 21, 22 can preferably be disposed essentially tangentially to the axis of rotation 4 and can have the general configuration illustrated in FIGS. 3 and 4.

As shown in FIGS. 1 and 3, the tabs 21 can be located on the control plate 15 and can extend by means of extensions 32 into corresponding openings 33 of the thrust ring 16. Both the control plate 15 and the thrust ring 16 can be provided with extensions 15a and 17 which project radially outward therefrom. These extensions 15a and 17 can be provided with stop edges 23 and 24 respectively, as shown in particular in FIGS. 3 and 4. For this purpose, the projections 17 can preferably also be labelled as centering lugs 17 on the thrust ring 16.

As illustrated in FIGS. 1–3a the control plate 15 can be equipped with tabs 18 which function as stop edges 23, and for which there can be corresponding notches 25 in the windows 9. Both these tabs 18 and the centering lugs 17, in the idle position of the clutch disc 1, are preferably configured so that the tabs 18 surround the end surfaces of the coil springs 11 and 12 essentially with no clearance. Thus, since the tabs 18 engage the end surfaces of the springs 12, which springs 12 are essentially centrally disposed about the hub, it can be possible for the tabs 18 with their stop edges 23 to center the control plate 15, as illustrated in FIG. 2, in the y-direction. Similarly, the centering lugs 17 with the stop edges 24 of the thrust ring 16 can center the thrust ring 16, by means of the coil springs 11 in the x-direction. Since the control plate and thrust ring can be guided in relation to one another by means of tabs 21, the two parts 15 and 16 can be centered in the x-direction and in the y-direction. Thus, as a result of the essentially symmetrical distribution of the coil springs 11 and 12, there can thus be an essentially accurate centering of the control plate 15 and thrust plate 16.

In contrast to FIG. 1, in which the tabs 21 start from the control plate 15, an alternative embodiment is shown in FIG. 2, in which the tabs 22 start from the thrust ring 16. In connection with FIG. 4, it can thereby be seen that the tabs 22, of the thrust ring 16, penetrate by means of a projection into the control plate 15 (shown in FIG. 1), and thus create a non-rotating connection between the thrust ring 16 and control plate 15. In addition, axial support can also be simultaneously provided. This axial support makes possible the generation of a friction force by the spring 14, so that a controlled application of the friction force becomes possible when there is a relative movement between the cover plates 5 and 6 and the friction ring 13 on one hand, and between the control plate 15 and the thrust ring 16 on the other hand.

As shown in FIG. 1, the centering of the control plate 15 and the thrust ring 16 on the coil springs 11, 12 (shown in FIG. 2), rather than on the hub 2, can provide an additional space for the installation of an additional friction device radially inside the two parts 15 and 16. This additional friction device can preferably have two friction rings 28 and 29, one on each side of the hub disc 3, as well as a thrust collar 26 and a spring 27. This additional friction device can preferably be effective over the entire torsional angle, which, in at least one embodiment of the invention, could be, for example, the entire range of movement which can occur between the hub discs and the cover plate.

The space between the two parts 15 and 16 can also be used to install an idle spring device (not shown), in which case, for example, the hub disc can be split and provided with gear teeth, which could have a clearance corresponding to the range of action of the idle damper. Such an idle spring device is generally known in the art, and therefore not illustrated, or described in any greater detail herein.

FIG. 3 shows that the control plate 15 can also be designed without a thrust ring. Here, too, it is possible to omit the tabs 18 and to represent the stop edges 23 only by the control plate 15. Such a control plate 15 would then essentially be centered only in the y-direction. However, a centering in the x-direction can also be possible by means of the axially-bent tabs 21. These tabs 21 can preferably be engaged with correspondingly small radial clearance in slots 20 in the hub disc 3, as shown in FIG. 1. As depicted in FIG. 1, there can preferably be only a small radial clearance between the upper surface of the tab 21 and the lower side of the spring 12, and between the lower surface of the tab 21 and a radial surface of the hub disc 3 inside the opening 20. Thus, there will be relatively little movement of the control plate 15 in the x-direction, and a centering in the x-direction can essentially be provided without the need for a corresponding thrust plate 16 as discussed above. The tabs 21 can also be used for an additional function, namely to control the friction insert, or lining. Such a control is essentially possible if the tabs 18 are not provided on the control plate 15.

FIG. 3a illustrates a variant of a hub disc 15. Here, the tab 18 of the control plate 15 can preferably be formed of a piece with an extension 34, which starts from the radially inner terminal area of the tab 18 and assumes an angle of approximately 90 degrees in relation to the tab 18. Thus the extension 34 can preferably run approximately tangential to the axis of rotation 4 (shown in FIG. 1), and close to the contour of the corresponding coil spring, whereby the guidance of the control plate 15 is guaranteed not only in the y-direction, essentially by the tabs 18, but also in the x-direction, essentially by the extension 34, and a limited radial play as discussed above for tab 21. Thus, in an alternative possible embodiment of the present invention, the tabs 21, illustrated in FIG. 3, can be omitted if only the one control plate 15 is to be used.

The friction ring 13 and the spring 14 illustrated in FIG. 1 are preferably oriented so that the spring 14, can preferably have its solid portion in contact with the inside of the cover plate 5, and its interrupted portion, which can essentially be formed by notches along the radially inner edge, in contact with the friction ring 13 in the vicinity of the average, or mean, friction radius. Each lug 30 of the friction ring 13 can thereby extend through a corresponding opening 31 in the cover plate 5 in the circumferential direction essentially without clearance. Each lug 30 can thereby also penetrate a corresponding notch in the spring 14. One set of the lugs 30 and openings 31 are shown in the sectional view of FIG. 1. As a result of this central introduction of force from the spring 14 into the friction ring 13, it can essentially be provided that the friction surfaces between the friction ring 13 and the control plate 15 are subjected to a substantially uniform load. The spring 14 can, in essence, be installed with its solid portion, both radially outside and radially inside, depending on the specific requirements and space available.

The spring 14 can, in an alternative embodiment, naturally also be designed as an undular, or corrugated-shaped washer, if necessary with openings or notches of engagement with the lugs 30.

As shown in FIG. 2, the control plate 15 and thrust plate 16 can essentially have substantially similar shapes and the discussion herebelow can therefore essentially apply to both. This shape can preferably be somewhat of an irregular hexagon with a central hole for being disposed about the hub. The ends thereof which engage a spring preferably extend further from the central hole to be able to engage a spring, while the side portions are disposed completely between adjacent spring. An angle between an end and one of the side wall portions can preferably be in a range of about 100° to about 110° and preferably about 105°, while an angle between two adjacent side portions can preferably be in a range of between about 140° to about 160° and preferably about 150°. At the juncture of each pair of side portions, there can preferably be the slot 33 for receiving the tab 32 therein. The centering lugs 17 preferably are formed by radial extensions at each of the ends of the control plate 15, and define a recess therebetween for receipt of a spring 12 therein. Approximately centrally between the lugs 17, within the recess, there can preferably be formed an additional slot for receiving the tab 22 therein. The tabs 22 and 32 preferably hold the control plate 15 and thrust plate 16 together for conjunctive movement of each together with the other.

One feature of the invention resides broadly in the torsional vibration damper and clutch disc for a friction clutch, comprising a hub with a hub disc, which defines an axis of rotation, control plates located on both sides of the hub disc and firmly connected to one another and held at a distance from one another, whereby the hub disc or at least one cover plate, radially outward, has friction linings, windows in the hub disc and cover plates for the installation of coil springs to absorb rotational impacts when torque is applied, a friction device between the hub disc and cover plates, which friction device can have a control plate for the control of a friction action as a function of the torsional angle, which control plate can interact with the springs in the hub disc, by means of two stop edges, which are essentially opposite one another in relation to the axis of rotation, characterized by the fact that the centering of the control plate 15 in at least one direction x; y perpendicular to the axis of rotation 4 is accomplished by means of at least two stop edges 23 approximately diagonally opposite one another, which interact with two opposite-facing end surfaces of the coil springs 12.

Another feature of the invention resides broadly in the torsional vibration damper as characterized by the fact that the stop edges 23 are formed by tabs 18 which are bent radially and run approximately radially and which control the friction effect preferably alone and in connection with corresponding windows 9 in the hub disc 3.

Yet another feature of the invention resides broadly in the torsional vibration damper characterized by the fact that the stop edges 23 are formed by tabs 18 which are bent axially and run approximately radially, which control the friction action preferably alone and in connection with corresponding windows 9 in the hub disc 3, whereby each of the tabs 18 is provided in its radially inside terminal area with an extension 34 which runs approximately tangential to the axis of rotation 4 and close to the contour of the corresponding coil spring 12, so that there is a centering in two directions x; y approximately perpendicular to one another.

Still another feature of the invention reside broadly in the torsional vibration damper characterized by the fact that there are additional axially-bent tabs 21 on the control plate 15 which run approximately tangential to the axis of rotation 4, and which are located approximately radially inside the respective springs 12, which are responsible for the guidance of the control plate 15 in the one direction y, and the tabs 21 run at a small radial distance from a corresponding cutout 20 in the hub disc 3, and are responsible for the radial guidance in a direction x rotated by approximately 90 degrees.

Another feature of the invention resides broadly in the clutch disc whereby thrust ring is located on the side of the hub disc opposite the control plate, and the two are axially braced and centered by axial tabs located on at least one of them, characterized by the fact that the thrust ring 16 has centering lugs 17 which run essentially radially and interact by means of stop edges 24 with the end surfaces of additional coil springs 11, such that at least two approximately diagonally opposite centering lugs 17 with their stop edges 24 interact with two opposite facing end surfaces of the additional coil springs 11, and there are centering lugs 17 and coil springs 11 offset by approximately 90 degrees in relation to the tabs 18 and coil springs 12 for centering in both directions x, y.

Yet another feature of the invention resides broadly in the clutch disc characterized by the fact that there are preferably a total of four coil springs 11, 12 distributed over the circumference which, together with four respective stop edges 23, 24 of the control plate 15 and the thrust ring 16 center the latter.

Still another feature of the invention resides broadly in the clutch disc characterized by the fact that between the control plate 15 and the one cover plate 5 there is a friction ring 13 in direct contact with the control plate 15 and non-rotationally but axially movably connected to the cover plate 5 by means of numerous lugs 3 distributed on the circumference, which extend without play into openings 31 on the circumference of the control plate 5, which control plate, by means of a spring plate or membrane 14 which is braced with the solid edge on the inside of the control plate 5 and with the edge interrupted by slots in the vicinity of the average, or mean friction radius is braced against the friction ring, is pushed away from the cover plate 5 toward the control plate 15, there are several tabs 21 located on the cover plate, bent axially and running essentially tangential to the axis of rotation 4, which tabs penetrate the hub disc 3 in cutouts 20 with clearance, an on the other side are in axial contact with a thrust ring 16, and by means of extensions 32 are located non-rotationally in openings 33 of the thrust ring 16, and there is a friction ring 19 between the thrust ring 16 and the other control plate 6.

A further feature of the invention resides broadly in the clutch disc characterized by the fact that radially inside the control plate 15 and thrust ring 16 there is at least one additional friction device, possible in connection with an idle spring device and a split hub disc.

Some examples of clutch discs having control plates which could have components which are interchangeable with the embodiments of the present invention are disclosed by the following U.S. Pat. Nos.: 5,201,394 to Suzuki, entitled "Clutch Disk Assembly"; U.S. Pat. No. 4,577,742 to Saida, entitled "Clutch Disc"; U.S. Pat. No. 4,044,874 to Worner, entitled "Clutch Disc with Plural Friction Dampers"; and U.S. Pat. No. 3,982,617 to Worner, entitled "Clutch Disc for Main Clutches of Motor Vehicles".

Some examples of clutch discs having thrust rings which could have components which are interchangeable with the embodiments of the present invention are disclosed by the following U.S. Pat. Nos.: 4,863,005 to Parzefall, entitled "Friction Clutch"; U.S. Pat. No. 4,832,166 to Parzefall, entitled "Friction Clutch for Motor Vehicles"; and U.S. Pat. No. 4,669,594 to Weissenberger and Hayen, entitled "Clutch Disc for a Motor Vehicle Friction Disc Clutch".

Additional examples of clutch discs and friction linings, which could have components interchangeable with the embodiments of the present invention are disclosed by the following U.S. Pat. Nos.: 5,000,304 to Koch, Raab, Dotter and Ament, entitled "Clutch Disc"; U.S. Pat. No. 4,941,558 to Schraut, entitled "Clutch Disc"; U.S. Pat. No. 4,854,438 to Weissenberger and Huditz, entitled "Clutch Disc for a Friction Disc Clutch"; U.S. Pat. No. 4,741,423 to Hayen, entitled "Clutch Disc for a Friction Clutch"; and U.S. Pat. No. 4,715,485 to Rostin, Tomm and Hartig, entitled "Clutch Disc for a Motor Vehicle Friction Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission for a motor vehicle, said friction clutch comprising:

a housing;

a clutch disc disposed within said housing, said clutch disc defining an axis of rotation and an axial direction parallel to said axis of rotation;

pressure plate means disposed within said housing and movable in said axial direction, said pressure plate means for applying an axial force to said clutch disc along the axial direction;

biasing means for biasing said pressure plate means in the axial direction to apply said axial force to said clutch disc;

said clutch disc comprising:

a hub, said hub comprising means for engaging shaft means of a transmission, and said hub having a diameter and a circumference;

a hub disc disposed concentrically about said hub and extending radially away from said hub, said hub disc having a first side and a second side;

a first cover plate disposed adjacent said first side of said hub disc;

a second cover plate disposed adjacent said second side of said hub disc;

said first and second cover plates being rotatable about said hub with respect to said hub disc;

a plurality of biasing members disposed about said hub for torsionally damping said friction clutch;

control plate means disposed about said hub, said control plate means having an orifice for being disposed about said hub, said orifice having a diameter, said diameter of said orifice being substantially greater than said diameter of said hub to define an annular space between said control plate means and said hub;

said control plate means comprising means for centering said control plate means about said hub in at least one direction; and said means for centering comprising means for engaging at least one of said biasing members;

said plurality of biasing members comprises two biasing members disposed spaced apart from one another about a substantial portion of the circumference of said hub;

said two spaced apart biasing members are disposed substantially circumferentially about said hub, and said two spaced apart biasing members are disposed substantially diametrically opposite one another with respect to said hub;

each of said at least two spaced apart biasing members has an end surface for being engaged by said means for engaging;

said means for engaging comprises:
means for engaging said end surface of a first one of said two spaced apart biasing members; and
means for engaging said end surface of a second one of said two spaced apart biasing members;

to center said control plate means in at least a first centering direction, the first centering direction being substantially transverse to the axis of rotation; and said means for engaging said end surface of said first biasing member and said means for engaging said end surface of said second biasing member being disposed essentially diametrically opposite one another with respect to said hub;

said means for engaging said end surface of said first biasing member and said means for engaging said end surface of said second biasing member are disposed diametrically opposite one another with respect to said hub; and means for centering said control plate means about said hub in a second centering direction, the second centering direction being substantially perpendicular to said first centering direction and said axis of rotation.

2. The friction clutch according to claim 1, wherein:

said end surface of each of said at least two biasing members is a first end surface, said first end surface of each of said at least two biasing members being disposed to face along a substantially tangential direction with respect to the axis of rotation;

said first end surface of one of said at least two biasing members being disposed to face along a first tangential direction;

said first end surface of the other of said at least two biasing members being disposed to face along a second tangential direction;

said second tangential direction being substantially opposite to said first tangential direction;

said first and second tangential directions being oriented generally parallel to a linear dimension that defines said at least one first centering direction; and said means for engaging at least a portion of each of said at least two spaced apart biasing members comprises means for contacting said first end surface of each of said at least two spaced apart biasing members.

3. The friction clutch according to claim 2, wherein:

said means for contacting said first end surfaces comprise radially oriented surfaces disposed on said control plate means, said radially oriented surfaces comprising surfaces for respectively contacting said first end surfaces of each of said two spaced apart biasing members; and said radially oriented surfaces each define at least a portion of a recess for receiving therein a corresponding one of said two spaced apart biasing members.

4. The friction clutch according to claim 3, wherein:

said means for centering said control plate means in said second centering direction comprises an additional flange means extending from each said recess, said additional flange means extending from said control plate means both in an axial direction and in a direction extending substantially tangentially with respect to the axis of rotation; and said additional flange means in each recess being disposed to contact said external surface and centering said control plate means about said hub in said second centering direction.

5. The friction clutch according to claim 4, wherein:

said two spaced apart biasing members have an external surface disposed towards said control plate means within the corresponding recesses of said control plate means;

said hub disc and said first and second cover plates have openings therethrough for accommodating corresponding ones of said two spaced apart biasing members therein, said openings of said hub disc and said first and second control plates being substantially aligned in the absence of a rotating torque being applied thereto;

said friction clutch further comprises one of the following sets of features a), b) and c):

a):

said means for contacting said first end surfaces comprise radially oriented tabs extending form said control plate means, said radially oriented tabs each comprising a corresponding one of said radially oriented surfaces for contacting said first end surfaces of each of said two spaced apart biasing members;

said radially oriented tabs each comprise and axially oriented portion extending perpendicularly from said control plate means to define said surfaces for contacting said first end surfaces of said biasing members;

said additional flange means in each recess extending axially through said openings of said hub disc;

said openings of said hub disc and each of said additional flange means defining a radial gap therebetween;

each of said additional flange means being configured for centering said control plate means in said second centering direction; and each of said additional flange means being disposed separately from said radially oriented tabs;

b):

said additional flange means in each recess extending axially through said openings of said hub disc;

said openings of said hub disc and each of said additional flange means defining a radial gap therebetween; and each of said additional flange means being configured for centering said control plate means in said second centering direction;

c):

said means for contacting said first end surfaces comprise radially oriented tabs extending from said control plate means, said radially oriented tabs each comprising a corresponding one of said radially oriented surfaces for contacting said first end surfaces of each of said two spaced apart biasing members;

said radially oriented tabs each comprise an axially oriented portion extending perpendicularly from said control plate means to define said surfaces for contacting said first end surfaces of said biasing members:

said openings of said hub disc and each of said additional flange means defining a radial gap therebetween;

each of said additional flange means being configured for centering said control plate means in said second centering direction; and each of said additional flange means being directly integral and contiguous with respect to a corresponding one of said radially oriented tabs;

said at least two spaced apart biasing members each comprise a second end surface disposed opposite to the respective first end surface thereof;

said means for engaging said first end surface of each of said at least two spaced apart biasing members further comprises means for contacting said second end surface of each of said at least two spaced apart biasing members;

said biasing members are grasped between said means for engaging said first end surface and said means for contacting said second end surface;

said biasing members comprise coil springs;

said first and second cover plates are fastened together to rotationally move together with respect to said hub disc upon a torque being applied to said first and second cover plates;

said coil springs in said openings being configured for damping relative rotational movement between said hub disc and said first and second cover plates;

said clutch disc further comprises first friction means disposed between at least a portion of said hub disc and said first cover plate;

said clutch disc further comprises second friction means disposed between at least a portion of said hub disc and said second cover plate;

said first and second friction means being for increasing frictional engagement between said hub disc and said first and second cover plates;

said control plate means being configured for controlling friction action of said first and second friction means;

second control plate comprises friction longings disposed radially outwardly of said second cover plate;

said control plate means comprises an irregular hexagonal shape having first and second ends disposed opposite one another, said first and second ends each comprising said first and second radially oriented tabs and said recess formed therebetween;

said control plate means further comprises first and second sides disposed opposite one another and connecting said first and second ends of said control plate means, each of said first and second sides each comprising a first side portion disposed adjacent said first end and a second side portion disposed adjacent said second end;

said first end of said control plate means being disposed at an angle of about 106° with respect to said first side portions, said second end of said control plate means being disposed at an angle of about 106° with respect to said second side portions, and said first side portions being disposed at an angle of about 150° with respect to said second side portions;

said plurality of biasing members comprises at least four coil springs, disposed substantially equidistant from one another and circumferentially about said clutch disc, with two of said at least four coil springs being disposed in said recesses of said first and second ends of said cover plate means, and at least two additional ones of said at least four coil springs disposed adjacent said first and second sides of said control plate means;

said clutch disc further comprises a friction ring disposed between said control plate means and said second control plate;

said friction ring being in direct axial contact with said control plate means, and axially moveable with respect to said second cover plate;

said cover plate comprising a plurality of radially oriented openings in the vicinity of said friction ring, and said friction ring comprising at least two lugs for extending into and non-rotationally bracing said friction ring with said second cover plate; and said clutch disc further comprising a biasing ring disposed about said hub between said friction ring and said control plate for biasing said friction ring into said direct axial contact with said control plate means.

6. The friction clutch according to claim 3, wherein:

said control plate means is disposed between said second cover plate and said hub disc;

said clutch disc further comprises a thrust plate disposed between said first cover plate means and said hub disc;

said clutch disc further comprises means for axially connecting said thrust plate to said control plate means for conjunctive radial and axial movement of said thrust plate and said control plate means;

said thrust plate has an orifice for being disposed about said hub, said orifice having a diameter, said diameter of said orifice of said thrust plate being substantially greater than said diameter of said hub to define a space between said thrust plate and said hub;

said plurality of biasing members comprises at least two additional biasing members disposed substantially diametrically opposite one another about said hub disc, and between said two spaced apart biasing members;

said thrust plate comprising said means for centering said control plate means about said hub in said second centering direction; and said means for centering said control plate means in said second centering direction comprising means, disposed on said thrust plate, for engaging said at least two additional biasing members to simultaneously, via said means for axially connecting said thrust plate with said control plate means, center both of said thrust plate and said control plate means in each of said first and second centering directions.

7. The friction clutch according to claim 6, wherein:

each of said at least two additional biasing members has a first end surface and a second end surface and defines a longitudinal dimension therebetween, said longitudinal dimension of said at least two additional biasing members being oriented along a substantially tangential direction with respect to the axis of rotation;

said means for engaging at least a portion of each of said at least two additional biasing members comprises means for contacting said first end surfaces of each of said at least two additional biasing members;

said means for contacting said first end surfaces of said at least two additional biasing members comprise radially oriented surfaces disposed on said thrust plate, said radially oriented surfaces comprising surfaces for respectively contacting said first end surfaces of each of said at least two additional biasing members;

said radially oriented surfaces of said means for contacting said first end surfaces of said at least two additional biasing members each define at least a portion of a recess for receiving therein a corresponding one of said at least two additional biasing members;

said at least two spaced apart biasing members each comprise a second end surface disposed opposite to the respective first end surface thereof;

said means for engaging said first end surface of each of said at least two spaced apart biasing members further comprises means for contacting said second end surface of each of said at least two spaced apart biasing members;

said biasing members are grasped between said means for engaging said first end surface and said means for contacting said second end surface;

said means for axially connecting comprise:

axially extending flange means extending from at least one of said control plate means and said thrust plate to the other of said control plate means and said thrust plate; and notch means disposed in the other of said control plate means and said thrust plate for receiving at least a portion of said axially extending flange means therein;

said biasing members comprise coil springs;

said hub disc and said first and second cover plates have openings therethrough for receipt of said coil springs therein, said openings of said hub disc and said first and second cover plates being substantially aligned in the absence of a rotating torque being applied thereto;

said first and second control plates are fastened together to rotationally move together with respect to said hub disc upon a torque being applied to said first and second cover plates;

said coil springs in said openings being configured for damping relative rotational movement between said hub disc and said first and second cover plates;

said clutch disc further comprises first friction means disposed between at least a portion of said hub disc and said first cover plate;

said clutch disc further comprises second friction means disposed between at least a portion of said hub disc and said second cover plate;

said first and second friction means being for increasing frictional engagement between said hub disc and said first and second cover plates;

said control plate means being configured for controlling friction action of said first and second friction means;

said second cover plate comprises friction linings disposed radially outwardly of said second cover plate;

each of said control plate means and said thrust plate comprises an irregular hexagonal shape having first and second ends disposed opposite one another;

said thrust plate and said control plate means further comprises corresponding first and second sides disposed opposite one another and connecting said first and second ends, each of said first and second sides each comprising a corresponding first side portion disposed adjacent said first end and a corresponding second side portion disposed adjacent said second end;

said first end of each of said thrust plate and said control plate means being disposed at an angle of about 106° with respect to corresponding first side portions, said second end of said thrust plate and said control plate means being disposed at an angle of about 106° with respect to corresponding second side portions, and said first side portions of each of said thrust plate and said control plate means being disposed at an angle of about 150° with respect to said second side portions thereof;

said axially extending flange means extend axially through said coil spring openings of said hub disc;

said clutch disc further comprises a friction ring disposed between said control plate means and said second cover plate;

said friction ring being in direct axial contact with said control plate means, and axially moveable with respect to said second cover plate;

said cover plate comprising a plurality of radially oriented openings in the vicinity of said friction ring, and said friction ring comprising at least two lugs for extending into and non-rotationally bracing said friction ring with said second cover plate;

said clutch disc further comprising a biasing ring disposed about said hub between said friction ring and said cover plate for biasing said friction ring into said direct axial contact with said control plate means; and said clutch disc further comprises an additional friction ring disposed between said thrust plate and said first cover plate, said biasing ring further applying an axial force to said thrust plate, via said means for axially connecting, to frictionally engage said thrust plate with said first cover plate.

8. A clutch disc for a friction clutch, said clutch disc comprising:

a hub, said hub defining an axis of rotation;

a hub disc disposed concentrically about said hub and extending radially away from said hub, said hub disc having a first side and a second side;

a first cover plate disposed adjacent said first side of said hub disc;

a second cover plate disposed adjacent said second side of said hub disc;

said first and second cover plates being rotatable about said hub with respect to said hub disc;

a plurality of biasing members disposed about said hub for torsionally damping said friction clutch;

said plurality of biasing members comprising at least two biasing members;

said at least two biasing members being a first biasing member and a second biasing member;

each of said first biasing member and said second biasing member having an end surface;

control plate means disposed about said hub;

said control plate means comprising means for centering said control plate means about said hub in at least one first direction;

said means for centering comprises means for engaging said end surface of said first biasing member;

said means for centering comprises means for engaging said end of said second biasing member;

said hub has a diameter and a circumference;

said control plate means has an orifice for being disposed about said hub, said orifice having a diameter, said diameter of said orifice being greater than said diameter of said hub to define a space between said control plate means and said hub;

said means for engaging said end surface of said first biasing member and said means for engaging said end surface of said second biasing member are disposed diametrically opposite one another with respect to said hub; and means for centering said control plate means about said hub in a second centering direction, the second centering direction being substanitially perpendicular to said first centering direction and said axis of rotation.

9. The clutch disc according to claim 8, wherein:

said end surface of each of said first and second biasing members is a first end surface, said first end surface of each of said first and second biasing members being disposed to face along a substantially tangential direction with respect to the axis of rotation;

said first end surface of one of said first and second biasing members being disposed to face along a first tangential direction;

said first end surface of the other of said first and second biasing members being disposed to face along a second tangential direction;

said second tangential direction being substantially opposite to said first tangential direction;

said first and second tangential directions being oriented generally parallel to a linear dimension that defines said at least one first centering direction; and said means for engaging an end of each of said first and second biasing members comprises means for contacting said first end surface of each of said first and second biasing members.

10. The clutch disc according to claim 9, wherein:

said means for contacting said first end surfaces comprise radially oriented surfaces disposed on said control plate means, said radially oriented surfaces comprising surfaces for respectively contacting said first end surfaces of each of said two spaced apart biasing members; and first radially oriented surfaces each define at least a portion of a recess for receiving therein a corresponding one of said two spaced apart biasing members.

11. The clutch disc according to claim 10, wherein:

said means for centering said control plate means in said second centering direction comprises an additional flange means extending from each said recess, said additional flange means extending from said control plate means both in an axial direction and in a direction extending substantially tangentially with respect to the axis of rotation; and said additional flange means in each recess being disposed to contact said external surface and centering said control plate means about said hub in said second centering direction.

12. The clutch disc according to claim 11, wherein:

said two spaced apart biasing members have an external surface disposed towards said control plate means within the corresponding recesses of said control plate means;

said hub disc and said first and second cover plates have openings therethrough for accommodating corresponding ones of said two spaced apart biasing members therein, said openings of said hub disc and said first and second cover plates being substantially aligned in the absence of a rotating torque being applied thereto;

said friction clutch further comprises one of the following sets of features a), b) and c):

a):
said means for contacting said first end surfaces comprise radially oriented tabs extending from said control plate means, said radially oriented tabs each comprising a corresponding one of said radially oriented surfaces for contacting said first end surfaces of each of said two spaced apart biasing members;

said radially oriented tabs each comprise an axially oriented portion extending perpendicularly from said control plate means to define said surfaces for contacting said first end surfaces of said biasing members;

said additional flange means in each recess extending axially through said openings of said hub disc;

said openings of said hub disc and each of said additional flange means defining a radial gap therebetween;

each of said additional flange means being configured for centering said control plate means in said second centering direction; and each of said additional flange means being disposed separately from said radially oriented tabs;

b):
said additional flange means in each recess extending axially through said openings of said hub disc;

said openings of said hub disc and each of said additional flange means defining a radial gap therebetween; and each of said additional flange means being configured for centering said control plate means in said second centering direction;

c):
said means for contacting said first end surfaces comprise radially oriented tabs extending from said control plate means, said radially oriented tabs each comprising a corresponding one of said radially oriented surfaces for contacting said first end surfaces of each of said two spaced apart biasing members;

said radially oriented tabs each comprise an axially oriented portion extending perpendicularly from said control plate means to define said surfaces for contacting said first end surfaces of said biasing members;

said openings of said hub disc and each of said additional flange means defining a radial gap therebetween;

each of said additional flange means being configured for centering said control plate means in said second centering direction; and each of said additional flange means being directly integral and contiguous with respect to a corresponding one of said radially oriented tabs;

said at least two spaced apart biasing members each comprise a second end surface disposed opposite to the respective first end surface thereof;

said means for engaging said first end surface of each of said at least two spaced apart biasing members further comprises means for contacting said second end surface of each of said at least two spaced apart biasing members;

said biasing members are grasped between said means for engaging said first end surface and said means for contacting said second end surface;

said biasing members comprise coil springs;

said first and second cover plates are fastened together to rotationally move together with respect to said hub disc upon a torque being applied to said first and second cover plates;

said coil springs in said openings being configured for damping relative rotational movement between said hub disc and said first and second cover plates;

said clutch disc further comprises first friction means disposed between at least a portion of said hub disc and said first cover plate;

said clutch disc further comprises first friction means disposed between at least a portion of said hub disc and said second cover plate;

said first and second friction means being for increasing frictional engagement between said hub disc and said first and second cover plates;

said control plate means being configured for controlling friction action of said first and second friction means;

said second cover plate comprises friction linings disposed radially outwardly of said second cover plate;

said control plate means comprises an irregular hexagonal shape having first and second ends disposed opposite one another, said first and second ends each comprising said first and second radially oriented tabs and said recess formed therebetween;

said control plate means further comprises first and second sides disposed opposite one another and connecting said first and second ends of said control plate means, each of said first and second sides each comprising a first side portion disposed adjacent said first end and a second side portion disposed adjacent said second end;

said first end of said control plate means being disposed at an angle of about 160° with respect to said first side portions, said second end of said control plate means being disposed at an angle of about 106° with respect to said second side portions, and said first side portions being disposed at an angle of about 150° with respect to said second side portions;

said plurality of biasing members comprises at least four coil springs, disposed substantially equidistant from one another and circumferentially about said clutch disc, with two of said at least four coil springs being disposed in said recesses of said first and second ends of said cover plate means, and at least two additional ones of said at least four coil springs disposed adjacent said first and second sides of said cover plate means;

said clutch disc further comprises a friction ring disposed between said control plate means and said second cover plate;

said friction ring being in direct axial contact with said control plate means, and axially moveable with respect to said second cover plate;

said cover plate comprising a plurality of radially oriented openings in the vicinity of said friction ring, and said friction ring comprising at least two lugs for extending into and non-rotationally bracing said friction ring with said second cover plate; and said clutch disc further comprising a biasing ring disposed about said hub between said friction ring and said cover plate for biasing said friction ring into said direct axial contact with said control plate means.

13. The clutch disc according to claim 10, wherein:

said control plate means is disposed between said second cover plate and said hub disc;

said clutch disc further comprises a thrust plate disposed between said first cover plate means and said by disc;

said clutch disc further comprises means for axially connecting said thrust plate to said control plate means for conjunctive radial and axial movement of said thrust plate and said control plate means;

said thrust plate has an orifice for being disposed about said hub, said orifice having a diameter, said diameter of said orifice of said thrust plate being substantially greater than said diameter of said hub to define a space between said thrust plate and said hub;

said plurality of biasing members comprises at least two additional biasing members disposed substantially diametrically opposite one another about said hub disc, and between said two spaced apart biasing members;

said thrust plate comprising said means for centering said control plate means about said hub in said second centering direction; and said means for centering said control plate means in said second centering direction comprising means, disposed on said thrust plate, for engaging said at least two additional biasing members to simultaneously, via said means for axially connecting said thrust plate with said control plate means, center both of said thrust plate and said control plate means in each of said first and second centering directions.

14. The clutch disc according to claim 13, wherein:

each of said at least two additional biasing members has a first end surface and a second end surface and defines a longitudinal dimension therebetween, said longitudinal dimension of said at least two additional biasing members being oriented along a substantially tangential direction with respect to the axis of rotation;

said means for engaging at least a portion of each of said at least two additional biasing members comprises means for contacting said first end surfaces of each of said at least two additional biasing members;

said means for contacting said first end surfaces of said at least two additional biasing members comprise radially oriented surfaces disposed on said thrust plate, said radially oriented surfaces comprising surfaces for respectively contacting said first end surfaces of each of said at least two additional biasing members;

said radially oriented surfaces of said means for contacting said first end surfaces of said at least two additional biasing members each define at least a portion of a recess for receiving therein a corresponding one of said at least two additional biasing members;

said at least two spaced apart biasing members each comprise a second end surface disposed opposite to the respective first end surface thereof;

said means for engaging said first end surface of each of said at least two spaced apart biasing members further comprises means for contacting said second end surface of each of said at least two spaced apart biasing members;

said biasing members are grasped between said means for engaging said first end surface and said means for contacting said second end surface;

said means for axially connecting comprise:
axially extending flange means extending from at least one of said control plate means and said thrust plate to the other of said control plate means and said thrust plate; and
notch means disposed in the other of said control plate means and said thrust plate for receiving at least a portion of said axially extending flange means therein;

said biasing members comprise coil springs;

said hub disc and said first and second cover plates have openings therethrough for receipt of said coil springs therein, said openings of said hub disc and said first and second cover plates being substantially aligned in the absence of a rotating torque being applied thereto;

said first and second cover plates are fastened together to rotationally move together with respect to said hub disc upon a torque being applied to said first and second cover plates;

said coil springs in said openings being configured for damping relative rotational movement between said hub disc and said first and second cover plates;

said clutch disc further comprises first friction means disposed between at least a portion of said hub disc and said first cover plate;

said clutch disc further comprises second friction means disposed between at least a portion of said hub disc and said second cover plate;

said first and second friction means being for increasing friction engagement between said hub disc and said first and second cover plates;

said control plate means being configured for controlling friction action of said first and second friction means;

said second cover plate comprises friction linings disposed radially outwardly of said second cover plate;

each of said control plate means and said thrust plate comprises an irregular hexagonal shape having first and second ends disposed opposite one another;

said thrust plate and said control plate means further comprises corresponding first and second sides disposed opposite one another and connecting said first and second ends, each of said first and second sides each comprising a corresponding first side portion disposed adjancet said first end and a corresponding second side portion disposed adjacent said second end;

said first end of each of said thrust plate and said control plate means being disposed at an angle of about 106° with respect to corresponding first side portions, said second end of said thrust plate and said control plate means being disposed at an angle of about 106° with respect to corresponding second side portions, and said first side portions of each of said thrust plate and said control plate means being disposed at an angle of about 150° with respect to said second side portions thereof;

said axially extending flange means extend axially through said coil spring openings of said hub disc;

said clutch disc further comprises a friction ring disposed between said control plate means and said second cover plate;

said friction ring being in direct axial contact with said control plate means, and axially moveable with respect to said second cover plate;

said cover plate comprising a plurality of radially oriented openings in the vicinity of said friction ring, and said friction ring comprising at least two lugs for extending into and non-rotationally bracing said friction ring with said second cover plate;

said clutch disc further comprising a biasing ring disposed about said hub between said friction ring and said cover plate for biasing said friction ring into said direct axial contact with said control plate means; and said clutch disc further comprises an additional friction ring disposed between said thrust plate and said first cover plate, said biasing ring further applying an axial force to said thrust plate, via said means for axially connecting, to frictionally engage said thrust plate with said first cover plate.

* * * * *

UNITED STATES PATENT AND TRADEMARK OFFICE
CERTIFICATE OF CORRECTION

PATENT NO. : 5,630,491                  Page 1 of 2
DATED : May 20, 1997
INVENTOR(S) : Norbert AMENT and Harald RAAB It is certified that error appears in the above-identified patent and that said Letters Patent is hereby corrected as shown below:

In column 12, line 5, Claim 5, after 'extending', delete "form" and insert --from--.

In column 12, line 11, Claim 5, after 'comprise', delete "and" and insert --an--.

Column 13, line 21, Claim 5, should read --said second cover plate comprises friction linings disposed--

In column 17, line 16, Claim 10, before 'radially', delete "first" and insert --said--.

In column 18, line 55, Claim 12, after 'comprises', delete "first" and insert --second--.

In column 19, line 12, Claim 12, after 'about', delete "160°" and insert --106°--.

In column 19, line 46, Claim 13, after the second occurrence of 'said', delete "by" and insert --hub--.

UNITED STATES PATENT AND TRADEMARK OFFICE
CERTIFICATE OF CORRECTION

PATENT NO. : 5,630,491

DATED : May 20, 1997

INVENTOR(S) : Norbert AMENT and Harald RAAB

It is certified that error appears in the above-identified patent and that said Letters Patent is hereby corrected as shown below:

Column 21, line 17, claim 14, after "disposed", delete "adjancet" and insert --adjacent--.

Signed and Sealed this

Seventh Day of October, 1997

Attest:

Attesting Officer

BRUCE LEHMAN

Commissioner of Patents and Trademarks